United States Patent [19]
Turner et al.

[11] 3,731,846
[45] May 8, 1973

[54] FUEL SUPPLY SYSTEM FOR INTERNAL COMBUSTION ENGINE POWERED PORTABLE TOOLS AND THE LIKE

[76] Inventors: William A. Turner, 205 Sycamore Road; John J. Forrer, Jr., 200 Sycamore Road, both of Franklin, Va. 23851

[22] Filed: July 16, 1971

[21] Appl. No.: 163,252

[52] U.S. Cl. .................222/86, 30/181, 222/105
[51] Int. Cl. ........................B67b 7/24, B67b 9/00
[58] Field of Search..................222/81, 82, 85, 86, 222/88, 105, 183, 185; 30/181–187

[56] References Cited

UNITED STATES PATENTS

| | | | |
|---|---|---|---|
| 1,004,359 | 9/1911 | Brown | 222/86 |
| 2,131,644 | 9/1938 | Sherrell | 222/86 |
| 2,686,625 | 8/1954 | Sundholm | 222/88 |
| 2,046,309 | 6/1936 | Webber | 222/86 |

*Primary Examiner*—Samuel F. Coleman
*Assistant Examiner*—Larry Martin
*Attorney*—J. Maxwell Carson, Jr.

[57] ABSTRACT

A fuel system for a portable tool or the like powered by an internal combustion engine including a fuel compartment mounted thereon into which a fuel cell containing a supply of the proper fuel for such an engine may be downwardly moved. A cover element for the fuel compartment may be swung upwardly about a hinge line to permit the fuel cell to be positioned therein and then swung downwardly to be secured in a closed position; seal means being provided to substantially assure the liquid tightness of the fuel compartment when closed. The fuel compartment includes fuel cell rupturing or puncturing devices mounted therein in an upwardly extending position for penetrating the fuel cell as it is moved downwardly into the fuel compartment to permit fuel to flow therefrom into a fuel conduit extending from the lower portion of the fuel compartment towards the engine.

8 Claims, 7 Drawing Figures

Patented May 8, 1973
3,731,846
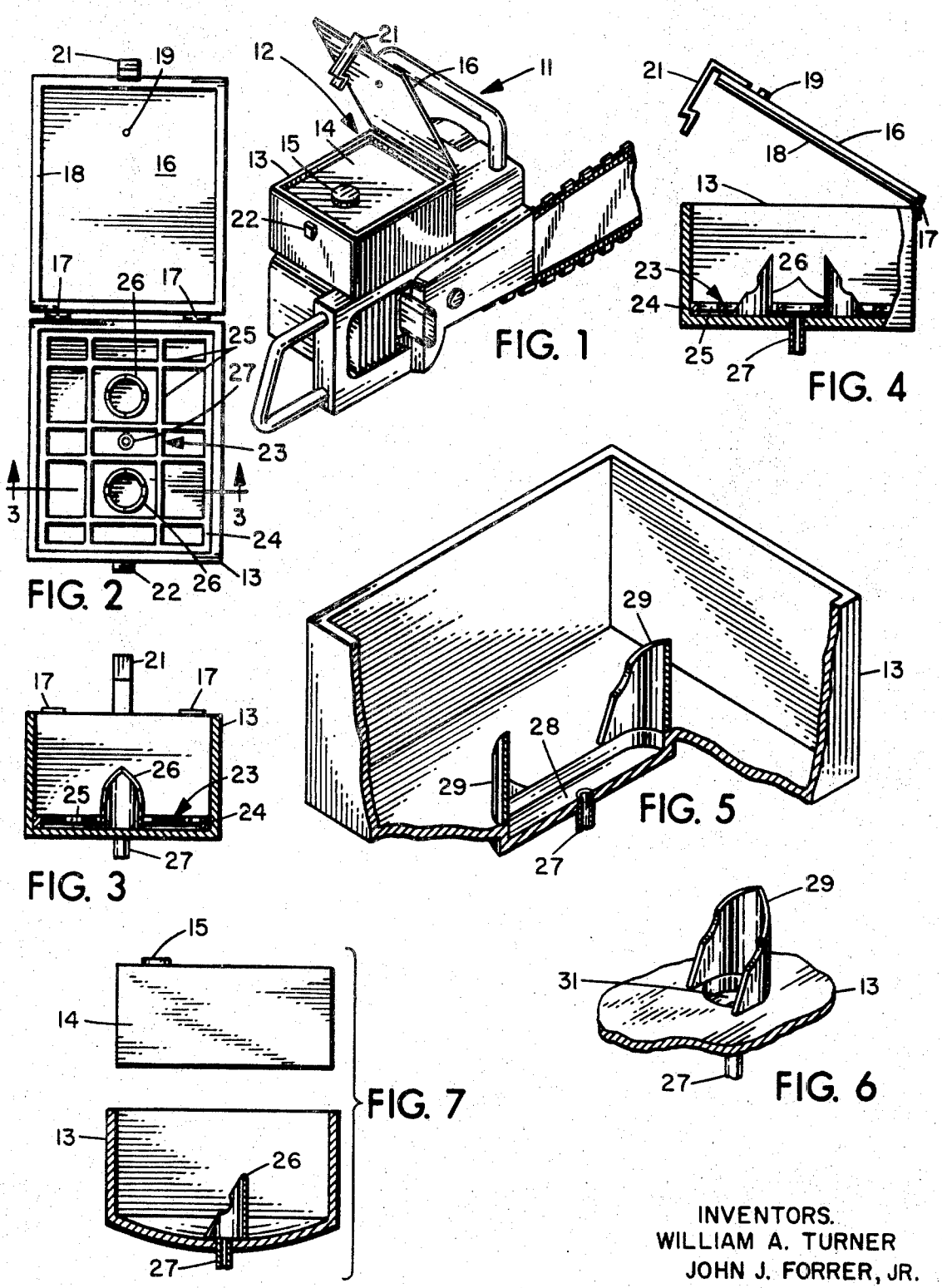
INVENTORS.
WILLIAM A. TURNER
JOHN J. FORRER, JR.
BY J. Maxwell Carson, Jr.
ATTORNEY

FUEL SUPPLY SYSTEM FOR INTERNAL COMBUSTION ENGINE POWERED PORTABLE TOOLS AND THE LIKE

This invention relates generally to a system for providing liquid fuel for an internal combustion engine used to power the operation of a portable tool or the like, and more particularly to such a fuel system including a fuel compartment into which a fuel cell containing a previously prepared supply of liquid fuel for such an engine may be positioned and thereby ruptured to permit fuel to flow from the fuel compartment through a conduit towards such engine.

Heretofore, an internal combustion engine provided as an integral component of a portable tool such as a chain saw, or the like, has been provided with liquid fuel which has merely been poured into a fuel tank connected thereto; such fuel flowing from such a fuel tank through a fuel feed line towards the engine. Other devices such as outboard motors used for propelling small boats have heretofore been similarly supplied with fuel; either from a fuel tank mounted adjacent thereto or from a remotely positioned fuel tank interconnected therewith by a fuel conduit extending therebetween. Such prior art devices usually require liquid fuel formed of a mixture of gasoline and lubricating oil in a ratio specified by the manufacturer of the internal combustion engine component thereof if optimum performance thereof is to be obtained. It will be apparent that circumstances may arise, however, in the course of operation of devices of the type hereinbefore mentioned, when the proper fuel and oil mixtures for the engines powering the same may be difficult to prepare and introduce into the fuel tanks therefor, and as a result such engines could be operated on fuel which would fail to provide top performance and which could also lead to engine failure and the resulting loss of the use of the tool or the like for the time that the engine is down for repair or replacement. The system for providing fuel for internal combustion engines for powering such devices forming the subject matter of the present application, however, is believed to overcome such drawbacks of prior art tools and the like mentioned hereinbefore, and to provide advantages not obtainable therewith.

Accordingly, an object of the present invention is the provision of a system for providing fuel for internal combustion engines used for powering portable tools and the like wherein properly mixed liquid fuel is prepackaged in a fuel cell positionable in a fuel compartment and thereby ruptured to permit such fuel to flow towards such an engine.

Another object of the instant invention is the provision of a portable tool or the like powered by an internal combustion engine provided with a fuel compartment in lieu of a fuel tank having means mounted therein to rupture a fuel cell containing a proper supply of fuel for such engine when positioned therein.

According to the present invention, the foregoing and other objects are attained by providing a portable tool of the like powered by an internal combustion engine with a fuel compartment in lieu of the fuel tank conventionally provided therefor. The fuel compartment may be closed by a lid or cover element hinged thereto maintainable in a closed position by a suitable closure device; seal means being provided to assure substantial liquid tightness between the fuel compartment and the cover element therefor when the cover element is maintained in its closed position. The cover element may be swung to an open position to allow a fuel cell containing a supply of the proper liquid fuel for the engine to be moved downwardly into the fuel compartment. The sides of the fuel cell are of a size and shape to substantially closely abut the interior sides of the fuel compartment when the fuel cell is positioned therein, while the lower wall of the fuel cell is positioned somewhat above at least a portion of the lower interior wall of the fuel compartment. At least one fuel cell rupturing device or the like is mounted on the lower interior wall of the fuel compartment to extend upwardly therefrom and puncture or rupture the lower wall of the fuel cell as it is moved downwardly into the fuel compartment to permit fuel to drain therefrom and flow into the upper terminus of a fuel conduit extending from the lower interior wall of the fuel compartment, or at least the portion thereof hereinbefore mentioned, positioned beneath the lower wall of the fuel cell; the fuel conduit thence extending towards the internal combustion engine.

A more complete appreciation of the invention and many of the attendant advantages thereof will be readily apparent as the same becomes better understood by reference to the following detailed description when considered in connection with the accompanying drawing wherein:

FIG. 1 is a partial and somewhat schematic perspective view of a portable tool powered by an internal combustion engine provided with the fuel system of the present invention;

FIG. 2 is a plan view of a first alternative embodiment of the fuel compartment of the fuel system of the present invention with the cover element thereof in an open position;

FIG. 3 is a sectional, end elevational view of the first alternative embodiment of the fuel compartment, taken on the line 3 — 3 of FIG. 2;

FIG. 4 is a side elevational view, partially in section, of the first alternative embodiment of the fuel compartment;

FIG. 5 is a partial perspective view, partially in section, of a second alternative embodiment of the fuel compartment of the fuel system of the present invention;

FIG. 6 is a fragmentary perspective view of a third alternative embodiment of the fuel compartment of the fuel system of the present invention; and FIG. 7 is an exploded side elevational view, partially in section, of a fourth alternative embodiment of the fuel compartment of the fuel system of the instant invention and the fuel cell downwardly moveable thereinto.

Referring now more particularly to the drawing, wherein like reference numerals designate the same or similar parts throughout the several views, and more specifically to FIG. 1, there is shown a portable tool, generally designated by the reference numeral 11, of the type powered by an internal combustion engine. Although the tool 11 explicitly illustrated in FIG. 1 is a chain saw, it is to be clearly understood that other tools may also be provided with the fuel supply system according to the present invention for fueling the internal combustion engine components thereof, as well as devices that are not classifiable as tools, such as outboard motors used for propelling water craft. In other words, any portable device powered by an internal combustion engine may advantageously utilize the novel fuel supply system according to the present invention in lieu of a conventional liquid fuel tank into which fuel is merely poured from a storage container.

The tool 11 is provided with a fuel supply system, generally designated by the reference numeral 12, including a fuel compartment 13 mounted thereon in the position conventionally occupied by a liquid fuel tank in the case of prior art tools of this type as mentioned hereinbefore. A fuel cell 14, as shown in FIG. 1 of the drawing, is positioned within the fuel compartment 13; the fuel cell 14 containing a supply of the proper liquid fuel for the particular engine powering the tool 11, usually a mixture of gasoline and lubricating oil prepared precisely in accordance with the specifications or recommendations of the manufacturer of such engine. The fuel cell 14 is of a size and shape to be fairly snugly positioned within the fuel compartment 13 in a predetermined manner, as more fully set forth hereinafter, and is preferably constructed of blown plastic or of a fairly soft and readily punctured metal such as sheet aluminum. When the fuel cell 14 has been filled with a liquid fuel as mentioned hereinbefore, a cap element 15 is placed on the inlet port thereof to close the same in liquid tight fashion.

Referring now to FIGS. 2 – 4 of the drawing as well as to FIG. 1 thereof, it will be seen that fuel compartment 13, viewed from above, is of substantially rectangular configuration, and is provided with a lid or cover element 16 connected thereto by the hinges 17 disposed at one of the edges thereof. The cover element 16 is shaped to overlie the upper edges of the side walls of fuel compartment 13 and extend over the interior cavity thereof, and a peripheral sealing strip 18 of a material such as rubber, cork, or Neoprene is carried by the cover element 16 on the underside thereof adjacent each of the edges thereof which, when the cover element 16 is positioned to close the fuel compartment 13, presses against the upper edges of the side walls of fuel compartment 13 to substantially prevent the interstitial leakage of liquid fuel from the fuel compartment 13.

A conventional air screw 19 extends downwardly through a suitably tapped aperture formed in the cover element 16 of fuel compartment 13. The air screw 19 is provided with a suitable head portion which, when the air screw 19 penetrates the cover element 16 to the maximum extent, presses tightly against the upper surface of cover element 16 about the tapped aperture to prevent the movement of air therethrough. When the air screw 19 is rotated and thereby partially withdrawn from the tapped aperture, air may flow therethrough; the air screw 19 being suitably apertured or fluted to allow such flow of air through the tapped aperture in which it is disposed.

The cover element 16 of fuel compartment 13 carries a flexible metallic closure device 21 centrally disposed adjacent the edge thereof remote from the parallel edge thereof hinged to the fuel compartment 13; the closure device 21 extending downwardly from the edge of the cover element 16 to which it is connected. When the cover element 16 of fuel compartment 13 is in its closed position, the closure device 21 engages a detent device 22 mounted on the fuel compartment 13 to secure the cover element 16 in its closed position. The cover element 16 may be released from its closed position, when desired, by manually flexing the closure device 21 to disengage the same from the detent device 22. It will, of course, be obvious that any other suitable and conventional catch device may be utilized, if desired, in lieu of the particular closure device 21 and detent device 22 illustrated in the drawing by way of example rather than of limitation.

As shown in FIGS. 2 – 4 of the drawing, the interior surfaces of the side walls of the fuel compartment 13 are vertically disposed and of uniform height. The fuel compartment 13 also includes a lower wall or bottom extending thereacross from the lower edges of the side walls thereof. A grid element, generally designated by the reference numeral 23, is placed in the fuel compartment 13 adjacent the lower wall or bottom thereof and the lower edges of the side walls thereof. Grid element 23 includes a peripheral rail or bar 24 contacting the lower wall or bottom of the fuel compartment 13 as well as substantially abutting a lower portion of each of the side walls thereof, and also includes a plurality of cross bars 25 interconnected with the peripheral rail or bar 24. The cross bars 25 of grid element 23 have uppermost surfaces coplanar with the uppermost surface of the peripheral rail or bar 24 and lowermost surfaces positioned above the lowermost surface of the peripheral rail or bar 24. It will thus be seen that all of the cross bars 25 of the grid element 23 are maintained at a distance above the lower wall or bottom of the fuel compartment 13.

The fuel compartment 13 is also provided with a pair of symmetrically disposed rupturing or puncturing devices 26 mounted on the lower wall or bottom thereof to extend upwardly therefrom between the cross bars 25 of the grid element 23. Each of the devices 26 is an essentially tubular metallic blade slanting from an uppermost substantially sharp point to a diametrically opposed lowermost portion situated adjacent the lower wall or bottom of the fuel compartment 13. The slanting opposed wall portions of the tubular device 26, at about the vertical midpoints thereof, are each provided with a notch formed therein in the shape of a segment of a circle.

A fuel conduit 27 extends downwardly from the fuel compartment 13 at about the center of the lower wall or bottom thereof towards the engine of the tool 11; the open upper terminus of the conduit 27 being disposed at the upper or interior surface of the lower wall or bottom of the fuel compartment 13.

When the fuel cell 14 is moved downwardly into the fuel compartment 13, the devices 26 puncture or rupture the lower wall of the fuel cell 14, permitting liquid fuel to drain therefrom into the space between the cross bars 25 of grid element 23 and the lower or bottom wall of fuel compartment 13 and thence into the fuel conduit 27. The slanting configuration of a rupturing or puncturing device 26 cuts a substantially circular piece of material almost completely away from the lower wall of the fuel cell 14 and forces it upwardly into the fuel cell 14 in a sloped attitude to clear a substantial aperture in the lower wall of the fuel cell 14; the notches formed in the slanting opposed walls of the tubular device 26 providing extra clearance between the device 26 and the material cut thereby from the lower wall of the fuel cell 14 for the passage of fuel therebetween. When the tool 11 is a chain saw as illustrated in the drawing, which would be held in a variety of positions when used, for example, by a professional woodsman in felling, limbing, and bucking trees, it is considered that the provision of dual fuel cell rupturing or puncturing devices 26 for opening up a considerable extent of the lower wall of the fuel cell 14, as well as the provision of the grid element 23 to permit liquid fuel to move around over substantially the entire upper surface of the lower wall or bottom of fuel compartment 13 before passing into the fuel conduit 27, would materially more readily allow the free flow of fuel towards the engine powering the tool 11 when the same is moved through a variety of operating attitudes.

As mentioned hereinbefore, the fuel cell 14 is, viewed from above, shaped and sized to be fairly snugly received within the area enclosed by the side walls of the fuel compartment 13. The height of the fuel cell 14 is such that when the same has been completely moved into the fuel compartment 13 and the lower wall of the fuel cell 14 rests upon the upper surface of the grid element 23, the upper surface of the cap element 15 of the fuel cell 14 is disposed fairly closely adjacent the lower surface of the cover element 16 when in its closed position. The ensuing fairly snug fit of the fuel cell 14 within the fuel compartment 13 assures the relative immobility of the fuel cell 14 for best results under operating conditions of the tool 11. The fit of the fuel cell 14 within the fuel compartment 13 is not so tight, however, as to prevent air entering the fuel compartment 13 past the air screw 19, as mentioned hereinbefore, from moving past the side walls of the fuel cell 14 towards the lower wall thereof, for the attainment of obviously advantageous results.

It will, of course, be apparent that, the fuel compartment 13 may be made with an internal cavity having a side wall or walls defining a geometrical shape other than rectangular, or even an irregular shape. Fuel cells 14 having a side wall or walls made to conform to such a side wall shape of the interior cavity of the fuel compartment 13 may then be provided to be introduced thereinto. By such an expedient, it will be possible to insure that only fuel cells containing precisely the proper fuel for the particular internal combustion engine powering a given tool may be moved downwardly into the fuel compartment mounted thereon, obviating the risk that fuel cells containing a different liquid fuel intended for other purposes could be used with possibly detrimental results.

Alternatively, the grid element 23 described hereinbefore may be dispensed with. In FIG. 5 of the drawing, the fuel compartment 13 is shown as having a somewhat elongated pocket 28 centrally disposed in the lower wall or bottom thereof, with a fuel cell rupturing or puncturing device 29 disposed adjacent each of the ends thereof. Each of the devices 29 is substantially similar to a device 26, being U-shaped, however, viewed from above rather than circular. Each device 29 has a substantially sharp uppermost point disposed at the plane of symmetry thereof and slants downwardly therefrom towards the tips of the U-form thereof. Fuel draining from a fuel cell ruptured by the devices 29 flows into the pocket 28 and then into the fuel conduit 27 centrally disposed with respect thereto.

When the tool or the like utilizing the fuel supply system according to the instant invention is not operated in a variety of attitudes, one fuel cell rupturing or puncturing device 29 substantially surrounding a circular pocket 31 formed centrally in the lower wall or bottom of the fuel compartment 13 may be adequate, as illustrated in FIG. 6 of the drawing. Fuel draining from a fuel cell ruptured by the single device 29 may flow into the pocket 31 and then into the fuel conduit centrally disposed with respect thereto.

Rather than forming a single pocket 31 in the lower wall or bottom of fuel compartment 13 for the reception of liquid fuel draining from a fuel cell ruptured by a fuel cell rupturing or puncturing device such as the device 26 or the device 29, the entire lower wall or bottom of a fuel compartment 13 may be centrally sloped downwardly from the lower extremities of the side walls thereof, as shown in FIG. 7 of the drawing. When the fuel cell 14 is moved downwardly into such a modified fuel compartment 13, the lower wall thereof will be positioned at the level of the lower extremities of the side walls of the fuel compartment 13, leaving the entire space beneath the lower wall of the fuel cell 14 and extending to the upper surface of the lower wall or bottom of the fuel compartment 13 as a receptacle for fuel draining from the ruptured fuel cell 14. One fuel cell rupturing or puncturing device 26 may be centrally positioned at the center of the lower wall or bottom of the fuel compartment 13 about the upper terminus of the fuel conduit 27, or the fuel cell rupturing or puncturing device 29 may instead be used. Of course, more than one of the fuel cell rupturing or puncturing devices 26 or 29 may be utilized with the fuel compartment 13 shown in FIG. 7 of the drawing, if desired.

The operator of the tool 11 or the like may carry a plurality of the fuel cells with him when the tool 11 or the like is placed in use. When one fuel cell positioned in the fuel compartment of the tool or the like as set forth hereinbefore has been drained of its contents, the empty fuel cell may be discarded and a full one placed in the fuel compartment in lieu thereof. Not only is the proper fuel for the engine powering the tool or the like thereby assured, but the liklihood that dirt or other foreign matter may enter the engine through the fuel conduit thereof is greatly reduced.

Obviously, many other modifications and variations of the present invention are possible in the light of the foregoing teachings. It is therefore to be understood that within the scope of the appended claims the invention may be practiced otherwise than as specifically described.

What is claimed as new and desired to be secured by Letters Patent of the United States is:

1. A fuel supply system for a portable tool or the like powered by an internal combustion engine of the type consuming during the normal operation thereof a liquid fuel including a mixture of gasoline and lubricating oil in a predetermined ratio, comprising:

a fuel compartment having an upwardly opening internal cavity and provided with a cover element moveable between an open position in which it in no manner overlies said fuel compartment internal cavity and a closed position in which it overlies and closes said fuel compartment internal cavity, said cover element carrying sealing means to render said fuel compartment substantially liquid tight when said cover element is maintained in said closed position thereof; said fuel compartment internal cavity having a side wall configuration of a particular size and shape selected for use exclusively with said type of internal combustion engine consuming during the normal operation thereof said liquid fuel including said mixture of gasoline and lubricating oil in said predetermined ratio; said fuel compartment also being provided with at least one fuel cell puncturing device mounted adjacent the bottom of said internal cavity thereof and projecting upwardly therefrom;

means for maintaining said cover element in said closed position thereof overlying said fuel compartment internal cavity;

a fuel cell having a particular preselected side wall configuration substantially conforming to said side wall configuration of said fuel compartment internal cavity positioned in said fuel compartment with said fuel cell puncturing device penetrating thereinto and initially containing a supply of said liquid fuel including said mixture of gasoline and lubricating oil in said predetermined ratio, said fuel cell being of a size to fit substantially snugly in said fuel compartment internal cavity, said fuel cell being downwardly moveable into said fuel compartment internal cavity when said cover element is in said open position thereof and being penetrable by said fuel cell puncturing device as it is moved downwardly into said fuel compartment internal cavity; and a liquid fuel conduit extending from said bottom of said fuel compartment internal cavity towards said internal combustion engine.

2. The fuel supply system according to claim 1, wherein said cover element is provided with an aperture formed therethrough carrying a device for selectively permitting air to flow through said aperture.

3. The fuel supply system according to claim 1, wherein said fuel compartment is mounted on said portable tool or the like.

4. The fuel supply system according to claim 1, wherein a grid element is interposed between a planar lower wall of said fuel cell and a planar bottom surface of said fuel compartment internal cavity; said grid element including a plurality of cross bars maintained at a distance above said planar bottom surface of said fuel compartment internal cavity; and wherein said fuel cell puncturing device is mounted on said planar bottom surface of said fuel compartment internal cavity to project upwardly between said cross bars of said grid element.

5. The fuel supply system according to claim 4, wherein a second fuel cell puncturing device is further mounted on said planar bottom surface of said fuel compartment to also project upwardly between said cross bars of said grid element and also penetrate said fuel cell.

6. The fuel supply system according to claim 1, wherein said fuel cell is formed with a planar lower surface and said bottom of said fuel compartment internal cavity is a conforming planar surface, said bottom planar surface of said fuel compartment internal cavity being provided with a pocket formed therein at least partially surrounded by said fuel cell puncturing device, and wherein the adjacent terminus of said fuel conduit is positioned at the level of the lowest point of said pocket.

7. The fuel supply system according to claim 6, wherein a second fuel cell puncturing device is further mounted on said bottom planar surface of said fuel compartment internal cavity to partially surround said pocket and also penetrate said fuel cell.

8. The fuel supply system according to claim 1, wherein said fuel cell is formed with a planar lower surface, and wherein said bottom of said fuel compartment is a downwardly concave surface.

* * * * *